United States Patent [19]

Enomoto et al.

[11] Patent Number: 4,956,205

[45] Date of Patent: Sep. 11, 1990

[54] METHOD OF IMPROVING WATER LUBRICITY OF CERAMICS

[75] Inventors: Yuji Enomoto; Yuko Tsunai, both of Tsukuba, Japan

[73] Assignees: Agency of Industrial Science & Technology, Ministry of International Trade; Ministry of International Trade & Industry, both of Tokyo, Japan

[21] Appl. No.: 329,597

[22] Filed: Mar. 28, 1989

[30] Foreign Application Priority Data

May 19, 1988 [JP] Japan .................................. 63-122850

[51] Int. Cl.$^5$ .............................................. B05D 3/12
[52] U.S. Cl. ..................................... 427/299; 184/109; 427/344; 427/399
[58] Field of Search ...................... 427/340, 344, 397.7, 427/399, 299; 184/109

[56] References Cited

U.S. PATENT DOCUMENTS

| | | | |
|---|---|---|---|
| 3,154,431 | 10/1964 | Santelli | 427/387 |
| 3,922,466 | 11/1975 | Bell et al. | 427/299 X |
| 4,775,548 | 10/1988 | Lankford, Jr. | 427/383.5 |
| 4,794,044 | 12/1988 | Arai et al. | 427/391 X |

*Primary Examiner*—Evan Lawrence
*Attorney, Agent, or Firm*—Oblon, Spivak, McClelland, Maier & Neustadt

[57] ABSTRACT

The water lubricity of ceramic materials is improved by a method including causing friction of the ceramic materials in the presence of water, thereby forming silanol groups on surfaces undergoing the friction, supplying the surfaces with a water-soluble silane coupling agent having alkoxyl groups to hydrolyze the alkoxyl groups into silanol groups, and reacting the silanol groups formed by the hydrolyzation of the alkoxyl groups with the silanol groups formed on the surfaces, thereby forming a siloxane film having siloxane bonds on the surfaces.

6 Claims, 9 Drawing Sheets

METHOD OF IMPROVING WATER LUBRICITY OF CERAMICS

BACKGROUND OF THE INVENTION

1. Field of the Invention

This invention relates to methods of maintaining the wear resistance of silicon nitride, alumina, zirconia and other wear-resistant ceramic structural materials even in the presence of water, and can be used in the lubrication of sliding areas in environments in which water is present, or in the lubrication of sliding areas which are required to be fire-resistant due to disaster prevention considerations in coal mines, hydraulic equipment and the like.

2. Prior Art Statement

Silicon nitride, alumina, zirconia and other engineering ceramics have mechanical properties which are greatly superior to metals in the areas of heat and wear resistance, and thus are expected to have applications in cutting tools, bearings, high-efficiency engines, high-efficiency gas turbines and the like.

Silicon nitride appears particularly promising because it is composed of elements which are plentifully available anywhere, in contrast to conventional cemented carbides composed of rare and unevenly distributed elements such as tungsten, cobalt, nickel and such.

When metal is used to make machine parts to be operated in environments in which water is present, the problem of rusting occurs, so ceramic materials which have no danger of rusting are suitable for these kinds of applications.

In addition, lubricating oil, solid lubricants or other lubricants which carry with them the danger of fire cannot be used to lubricate sliding parts in coal mines or hydraulic equipment which are required to be fire-resistant from disaster prevention considerations. Thus water-based lubricants are useful for these applications, but metals would not suitable due to the problem of oxidation, so ceramics are expected to be used in these kinds of applications.

Yet when these ceramic materials are subjected to friction, particularly at low speeds, both their coefficient of friction and wear losses become large and unstable (H. Tomizawa and T. E. Fischer, ASLE Trans. 30 (1987) 41.). This trend is particularly pronounced in silicon nitride, in which wear is severe even when a small amount of water contaminates another organic solvent.

The reason for this is that when silicon nitride is subjected to friction under water, the surface of the silicon nitride is oxidized into silicon dioxide which reacts with water to form a hydroxide. In other words, hydrogen, a component of water, is bonded onto the surface of ceramics to form silanol groups (→Si—OH) whose silicon atoms produce tetrahydroxysilane (Si(OH)$_4$) soluble in water by nucleophilic substitution reaction of water with the silicon atoms. Since the tetrahydroxysilane is eluted into the water, tribochemical wear takes place.

Since alumina, zirconia and other oxide ceramics are composed of oxides to begin with, they similarly react with water which causes corrosion cracking, resulting in friction and wear becoming unstable (S. Sasaki, Proc. Inter. Conf. Wear of Material, Denver (1989)).

Thus as described above, these ceramics are not suitable as structural materials for sliding parts in environments in the presence of water and thus improvement of the water lubricity of these ceramics is strongly desired.

OBJECT AND SUMMARY OF THE INVENTION

This invention came about in light of the above, and its object is to provide a method of markedly improving the water lubricity of ceramic materials.

In order to achieve this object, according to the present invention, there is provided a method of improving the water lubricity of ceramic materials in which hydroxides are formed on the surfaces undergoing friction when slid on each other in the presence of water, comprising the steps of supplying the surface undergoing friction with a lubricant of an aqueous solution of a water-soluble silane coupling agent which contains alkoxyl groups (→Si—OR) to hydrolyze the alkoxyl groups into silanol groups (→Si—OH), and subjecting the produced silanol groups and the silanol groups formed on the surface undergoing friction to dehydration condensation to form a film having siloxane bonds (→Si—O—Si←).

As described above, supplying the friction surface of a ceramic material with an aqueous solution of a silane coupling agent results in a condensation reaction of the silanol groups produced by the hydrolysis of alkoxyl groups with the silanol groups formed on the friction surface, forming a film which contains strong siloxane bonds. The film thus formed acts as a lubricant, reducing the coefficient of friction of the friction surface, providing wear resistance and improving the water lubricity of the ceramic material.

The above and other objects and features of the invention will become more apparent from the following detailed description with reference to the accompanying drawings.

DETAILED DESCRIPTION OF THE PREFERRED EMBODIMENTS

As described previously, when ceramic materials are slid together in water, hydroxides form on the sliding surfaces, both increasing wear and increasing friction. As a result of the inventors carrying out various studies and experiments intended to remedy this situation, the inventors discovered that supplying the sliding surface of a ceramic material with an aqueous solution of a silane coupling agent which contains alkoxyl groups resulted in a condensation reaction of the silanol groups produced by the hydrolysis of the alkoxyl groups with the silanol groups formed on the sliding surface, thus forming a film containing strong siloxane bonds. The film thus formed was found to act as a lubricant, reducing the coefficient of friction of the sliding surface and providing wear resistance, thus completing the present invention.

The ceramic materials to which this invention is applicable include not only silicon nitride but also alumina, zirconia and other oxide ceramics as long as hydroxides are formed on their friction surfaces when rubbed in the presence of water.

The silane coupling agent added to the lubricating solution supplied to the ceramic surface undergoing friction may be of any type as long as it is soluble in water and has alkoxyl groups. Table 1 below is a list of sample silane coupling agents which contain amino groups and are suitable for use as the silane coupling agents of the present invention.

TABLE 1

3-(2-Aminoethylaminopropyl)dimethoxymethylsilane $H_2N(CH_2)_2N(CH_2)_3Si(OCH_3)_2$ with H on N and $CH_3$ on Si Mol. wt. 206.4
b.p. 129–130° C./10 mmHg
d 0.975 g/ml (Hereafter abbreviated as 3(2AA)DMS.)

3-(2-Aminoethylaminopropyl)trimethoxysilane $H_2N(CH_2)_2N(CH_2)Si(OCH_3)_3$ with H on N Mol. wt. 222.4
b.p. 101–102° C./2 mmHg
d 1.025 g/ml (Hereafter abbreviated as 3(2AA)TMS.)

3-Aminopropyltriethoxysilane $H_2N(CH_2)_3Si(OC_2H_5)_3$

Mol. wt. 221.4
b.p. 67–68° C./3 mmHg
d 0.951 g/ml (Hereafter abbreviated as 3ATES.)

3-Aminopropyldimethylethoxysilane

TABLE 1-continued $H_2N(CH_2)_3SiOC_2H_5$ with $CH_3$ groups on Si

Mol. wt. 161.3
b.p. 78–79° C./24 mmHg
d 0.857 g/ml (Hereafter abbreviated as 3ADES.)

3-Aminopropyldiethoxymethylsilane $H_2N(CH_2)_3Si(OC_2H_5)_2$ with $CH_3$ on Si

Mol. wt. 191.3
b.p. 85–88° C./8 mmHg
d 0.916 g/ml (Hereafter abbreviated as 3ADMS.)

In addition to the above, vinyltrimethyoxysilane, γ-methacryloxypropyltrimethoxysilane, γ-glycidoxypropyltrimethoxysilane, γ-ureidopropyltriethoxysilane and others can also be used.

The concentration of the above silane coupling agents added to water shall be a concentration at which they can react with hydroxides formed on the sliding surface of the ceramic to for a film containing siloxane bonds.

When the sliding surfaces between two pieces of silicon nitride are supplied with an aqueous solution of one of the above silane coupling agents, water reacts with silicon dioxide formed by oxidation of the silicon nitride surface due to friction, forming silanol groups (→Si—OH) on that surface, leading to a condensation reaction of these silanol groups with the silanol groups (→Si—OH), products resulting from the hydrolysis of the alkoxyl groups, producing an alcohol (R—OH) and forming on the sliding surface a film of siloxane which contains strong bonds (→Si—O—Si←).

This siloxane is a stable substance and is soft, so its coefficient of friction is very small while its wear resistance is extremely good due to its protective action. In other words, this film acts as a lubricating layer to greatly reduce the coefficient of friction of the friction surface of silicon nitride while providing wear resistance. In the case of alumina, zirconia and other oxide ceramics also, they similarly react with water, producing hydroxides, leading to a condensation reaction of these hydroxide group (—OH) with the silanol groups (→Si—OH), products resulting from the hydrolysis of the alkoxyl groups, forming a film which contains strong siloxane bonds (→Si—O—Si←), thus markedly improving lubricity.

If the film which contains strong siloxane bonds described above should peel off due to friction, another film which contains strong siloxane bonds would form in the area which peeled, thus maintaining lubricity. For this reason, a continuous supply of silane coupling agents to the friction surface is preferred. Therefore, the lubricity can be easily improved by having friction of the ceramic occur in a 0.001M to 0.1M aqueous solution of silane coupling agent, but the lubricity can be improved by dripping or spraying an aqueous solution of silane coupling agent onto the friction surface.

As described above, the siloxane film is formed by the reaction of silanol groups (products resulting from the hydrolysis of the alkoxyl groups) with the silanol groups formed by the wear of ceramics, so a small amount of time is required to generate qualitative lubricity, but by using a high-concentration aqueous solution of silane coupling agents, or by allowing a sufficient amount of silane coupling agent solution to be adsorbed to the ceramic sliding surface in advance, lubricity can be rapidly manifested.

In addition, with this invention, an aqueous solution of silane coupling agent is weakly alkaline (pH≈10) and if propionic acid or such is used to make the solution acidic, the coefficient of friction will momentarily increase, but when neutralized the coefficient of friction will again decrease.

As is clear from the above explanation, with this invention, the water lubricity of silicon nitride, silicon carbide alumina, zirconia or other high-strength ceramics which form hydroxides when rubbed in the presence of water can be markedly improved so that they can be used as structural materials for sliding parts used in environments in the presence of water containing silane coupling agents, thus expanding their range of application.

Now, this invention will be described below with reference to examples. It should be noted that these examples are purely illustrative, and not limitative in any sense, of the present invention.

EXAMPLE 1

Figure 1A:
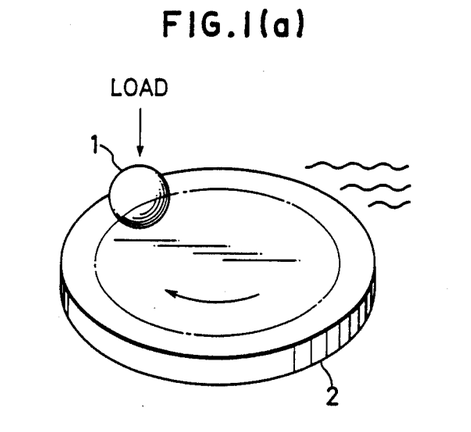
FIG. 1(a) is an explanatory view illustrating method of testing friction and wear.

As shown in FIG. 1(a), a 10 mm diameter ball 1 of silicon nitride (Al 3.36 atm %, Si 40.93 atm %, Y 1.73 atm %, N 20.33 atm % O 30.76 atm % Fe 2.89 atm %) was given a 10N load and friction tested against a silicon nitride disk 2 of the same composition. The test started from a speed of 50 mm/s and after sliding over a fixed distance (about 100 m), the speed was successively doubled to 800 mm/s. The coefficient of friction as a function of the sliding speed was then found with silane coupling agent solutions made by adding to deionized water 0.1M each of 3(2AA)DMS (Shin-Etsu Chemical Co., Ltd., Japan, Product number LS 2475, Lot 801010), 3(2AA)TMS (Product number LS 2480, Lot 801008), and 3ATES (Product number LS-3150, Lot 801017) listed in Table 1. For comparison, the friction test was carried out with water which contains no silane coupling agent under the same conditions, and the coefficient of friction as a function of sliding speed was then found.

Figure 2:
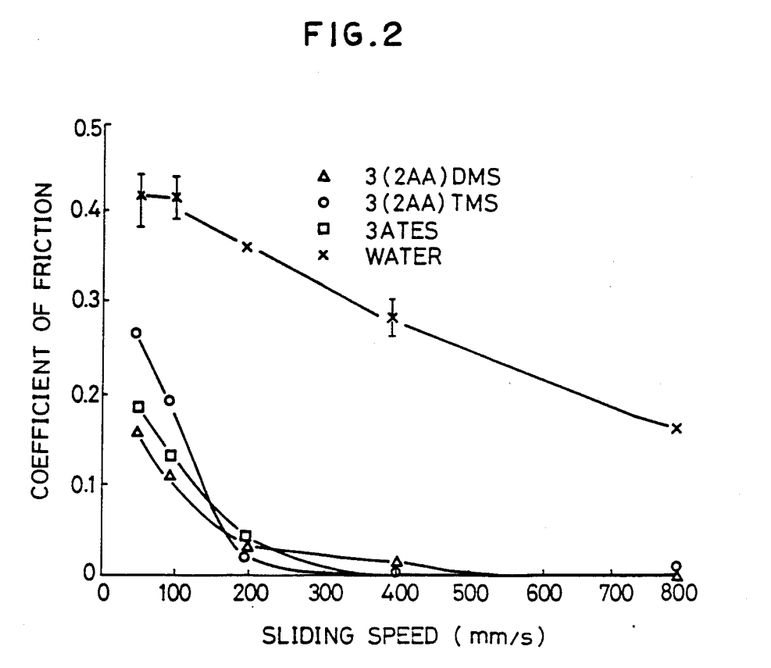
FIG. 2 is a graph showing the coefficient of friction as a function of the sliding speed when using a 0.1M aqueous solution of a silane coupling agent with amino group as a lubricant for the friction surface of silicon nitride.

The results, as shown in FIG. 2, indicated that at sliding speeds of approximately 400 mm/s and higher, the coefficient of friction was either extremely small or so close to 0 as to be immeasurable, demonstrating a marked improvement over the lubrication of water only.

EXAMPLE 2

Using a silicon nitride ball and disk of the same composition as in Example 1, and using aqueous solutions of 3(2AA)DMS and 3ATES at concentrations of 0.001M, 0.01 M, and 0.1M as the lubricant, with a load of 10N and speed of 100 mm/sec, a continuous friction test lasting 1,000 sec (100 m) was carried out and the specific wear rate of the ball was found by the following equation. For comparison, the test was also carried out using water with no silane coupling agent added as the lubricant.

Specific wear rate (mm$^2$/kgf)=wear volume (mm$^3$)/distance (mm)×load (kg/f)

Figure 1B:
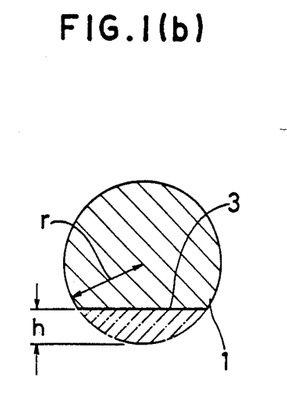
FIG. 1(b) is a sectional view of a specimen after friction testing.

(Here, the wear volume is the volume of the abraded area 3 of FIG. 1(b), given by $V=(\frac{1}{3})\pi h^2(3r-h)$.)

Figure 3:
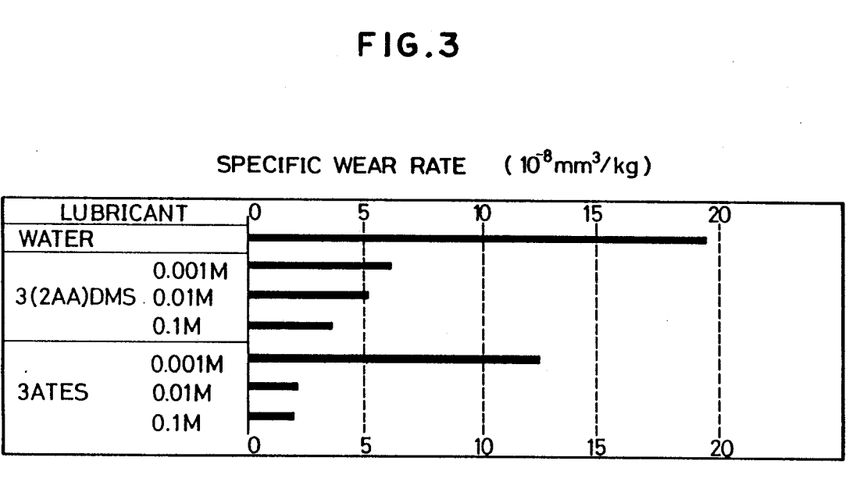
FIG. 3 is a graph showing the specific wear rate of a silicon nitride ball when using an aqueous solution of silane coupling agent with amino group as a lubricant.

The results of measurement are as shown in FIG. 3. The specific wear rates in comparison to water were approximately ¼ for a 0.01M water solution of 3(2AA)DMS, reduced to 1/5 in the case of a 0.1M solution, and 1/9 for a 0.01M aqueous solution of 3ATES, reduced to 1/10 in the case of a 0.1M solution.

While both the coefficient of friction and wear tend to be reduced with increasing silane coupling agent concentration, excessively high concentrations are not only uneconomical, but also result in increased lubricant viscosity and other problems.

Figure 4:
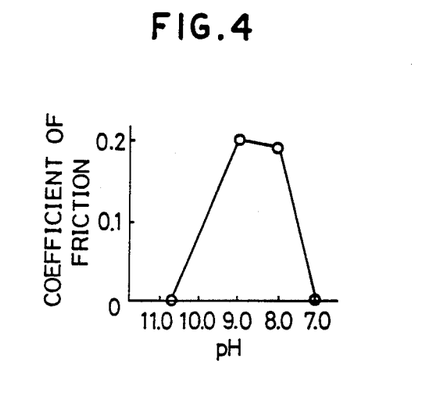
FIG. 4 is a graph showing the coefficient of friction of silicon nitride as a function of pH value of the lubricating fluids.

Note that when using a 0.1M concentration of 3(2AA)DMS as the lubricant the steady-state coefficient of friction was less than 0..01 as shown in FIG. 4. The pH of the friction surface was approximately 10.7, and when propionic acid (CH$_3$CH$_2$COOH) was added to adjust the pH, the coefficient of friction increased as the pH returned to the acidic side, but as the pH approached neutrality, the coefficient of friction began to drop so that the coefficient of friction returned to <0.01 as neutrality was attained.

EXAMPLE 3

Using a silicon nitride ball and disk of the same composition as Example 1, and using aqueous solutions of 3ATES at concentrations of 0.001M, 0.01M, and 0.1M as the lubricant, with a load of 19.6N and speed of 200 mm/sec, a continuous friction test lasting 180 minutes was carried out and the coefficient of friction was measured. For comparison, the coefficient of friction was also measured using water as the lubricant.

Figure 5:
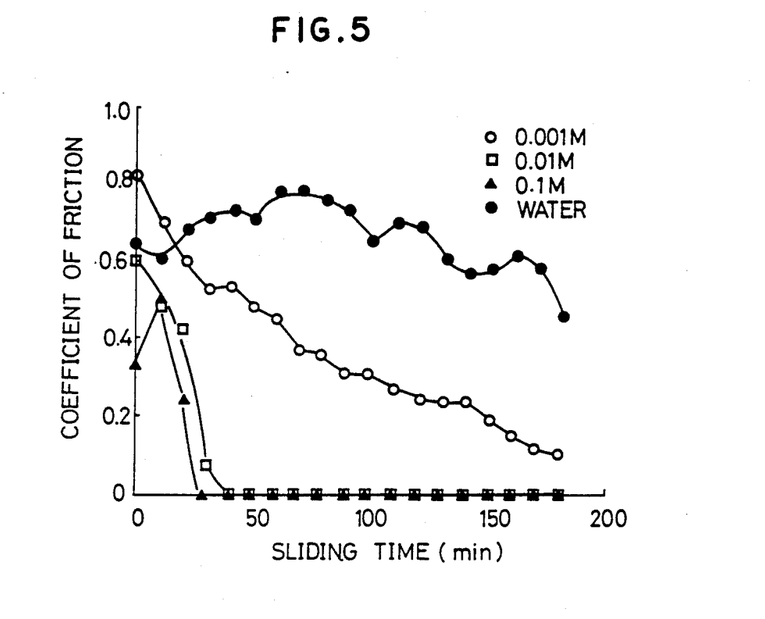
FIG. 5 is a graph showing the coefficient of friction of silicon nitride as a function of sliding time.

The results are shown on the graph of FIG. 5. At concentrations of 0.01M and above, a marked effect can be seen after 20 or more minutes have elapsed, and even at a concentration of 0.001M, the coefficient of friction can be seen to decrease progressively with the passage of time.

Figure 6:
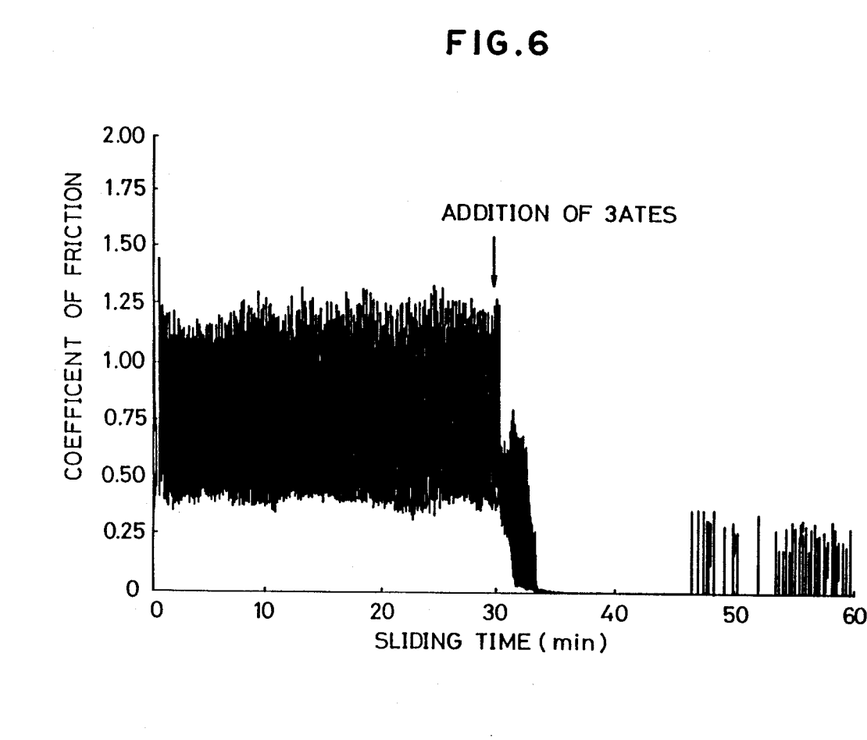
FIG. 6 is a graph showing the drop in the coefficient of friction when an aqueous solution of silane coupling agent is added to a silicon nitride friction surface.

FIG. 6 is a graph showing the change in coefficient of friction when a friction test was carried out under the same conditions but using water as the lubricant. After 30 minutes had elapsed, enough 3ATES was added to water to form a concentration of 0.1M.

As is clear from the graph, with the addition of 3ATES, the coefficient of friction drops to substantially 0 after about 4 minutes.

EXAMPLE 4

Using silicon nitride balls and disks of the same composition as in Example 1 and using aqueous solutions of the five silane coupling agents containing amino groups as listed in Table 1, i.e. 3(2AA)DMS, 3(2AA)TMS, 3ATES, 3ADES and 3ADMS, all products of Shin-Etsu Chemical Co., Ltd., at concentrations of 0.1M as the lubricant, with a load of 19.6N and velocity of 200 mm/sec, friction tests were carried out to measure changes in coefficient of friction with gradual increase in temperature on the friction surfaces.

Figure 7:
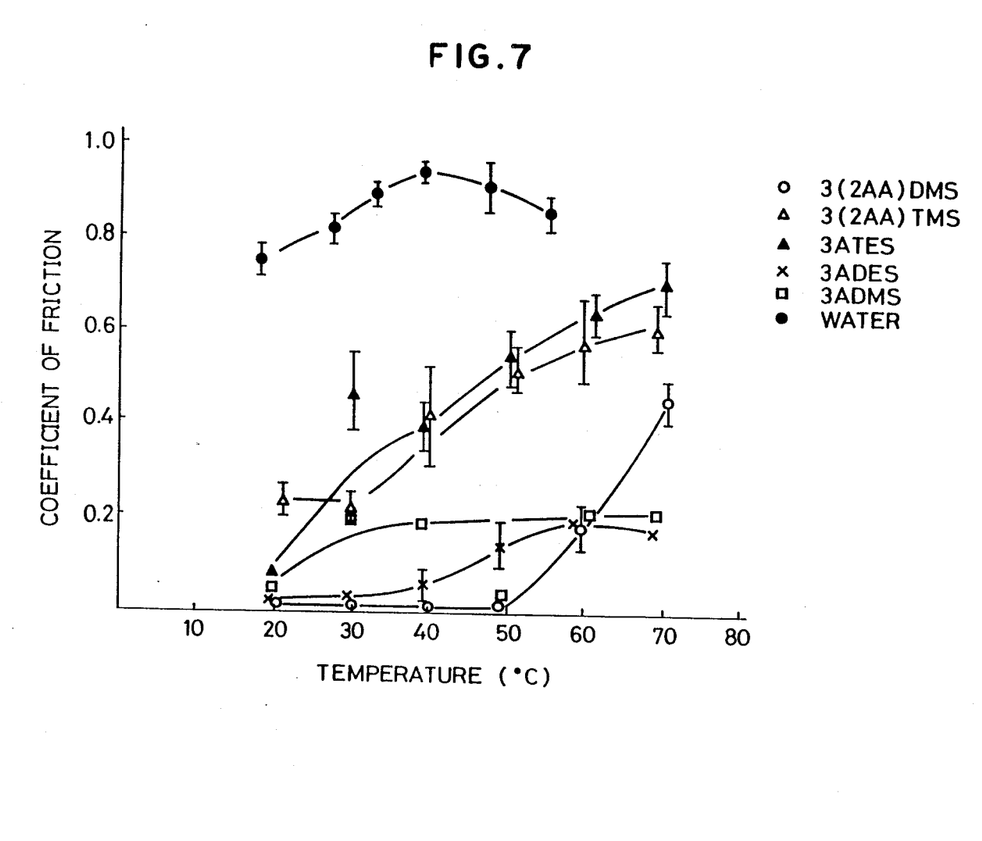
FIG. 7 is a graph showing the coefficient of silicon nitride as a function of temperature on the friction surface.

The results of measurement are as shown in FIG. 7. When 3(2AA)DMS, 3ADES or 3ADMS having one or two hydrolytic groups was used as the lubricant, the change in coefficient of friction was small in spite of the increase in temperature on the friction surface.

EXAMPLE 5

Using balls and disks as in FIG. 1 formed from (A) silicon nitride having the same composition as in Example 1, (B) silicon nitride having the composition shown in Table 2, a load of 19.6N was applied to the balls and an aqueous solution of 3ATES with a concentration of 0.1M was used as the lubricant in a friction test carried out at speeds of 20 mm/sec and 200 mm/sec over a distance of about 2,160 m, and the specific wear rate was measured For comparison, the coefficient of friction was also measured using water as the lubricant.

TABLE 2

| Si | Y | N | O | Fe | Cr | Cu | |
|---|---|---|---|---|---|---|---|
| 44.04 | 0.81 | 32.06 | 20.48 | 1.40 | 0.45 | 0.75 | (atm %) |

Figure 8:
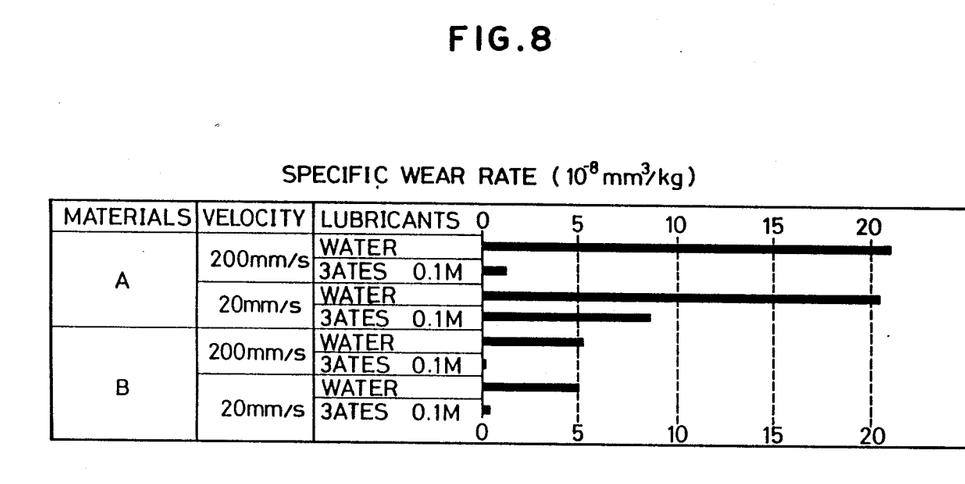
FIG. 8 is a graph showing the specific wear rate when the same aqueous solution of a silane coupling agent with amino group is added to two kinds of silicon nitride sliding surfaces of different compositions.

The results are shown in FIG. 8. While the specific wear rate of silicon nitride varies with composition, in any case, the specific wear rate can be seen to be markedly reduced with the addition of silane coupling agents.

EXAMPLE 6

Figure 9A:
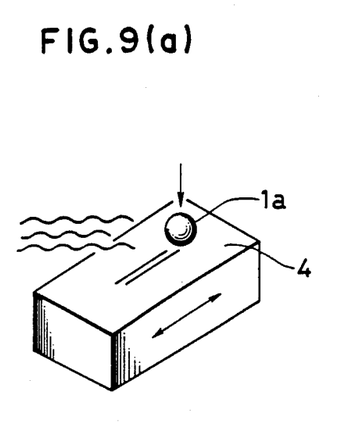
FIG. 9(a) is an explanatory view illustrating another method of testing friction and wear.
Figure 9B:
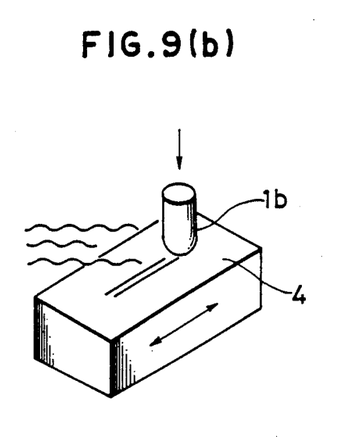
FIG. 9(b) is an explanatory view illustrating still another method of testing friction and wear.

A ball with a radius of approximately 1.5 mm was fabricated from silicon nitride and alumina, as shown in FIG. 9(a), and a cylinder with a hemispherical tip approximately 1.5 mm in radius was fabricated from silicon carbide as shown in FIG. 9(b), and each was rubbed against the surface of a block 4 of the same composition at a speed of 2 mm/sec using either water only or a 0.05M aqueous solution of 3(2AA)DMS as a lubricant in a reciprocating friction test. The test was started with a load of 0.4N and after a set period (5 min) of rubbing, the load was successively doubled to 12.8N.

Figure 10:
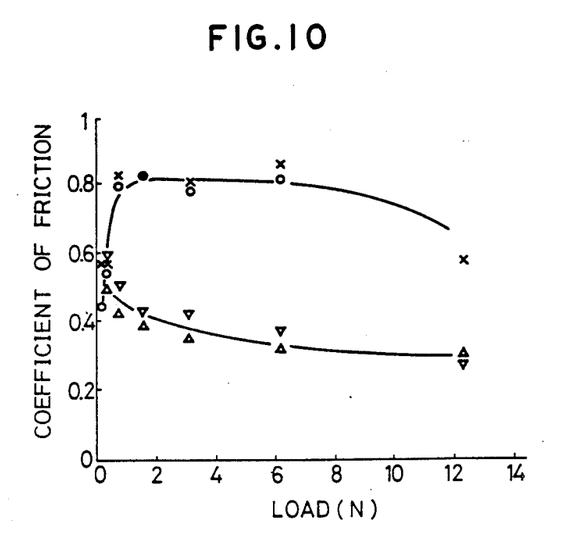
FIG. 10 is a graph showing the coefficient of friction as a function of load at low sliding speeds in silicon nitride.
Figure 11:
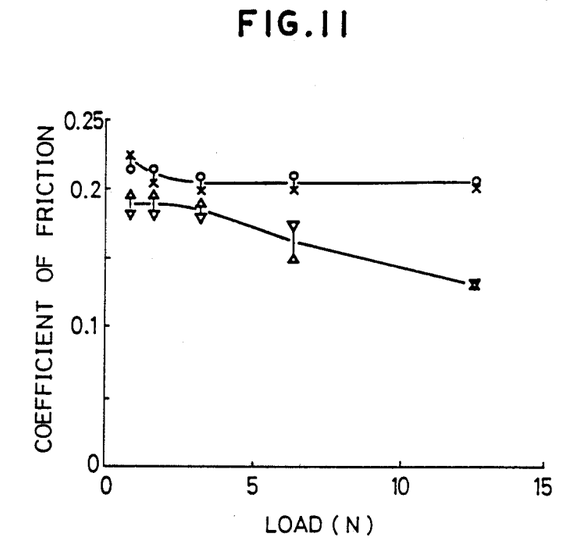
FIG. 11 is a graph showing the coefficient of friction as a function of load at low sliding speeds in silicon carbide.
Figure 12:
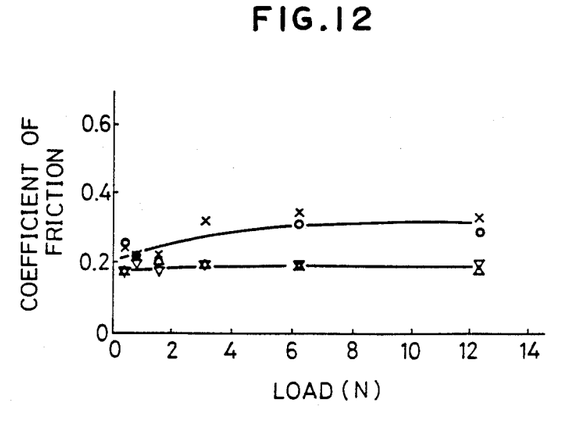
FIG. 12 is a graph showing the coefficient of friction as a function of load at low sliding speed in alumina.
Figure 13:
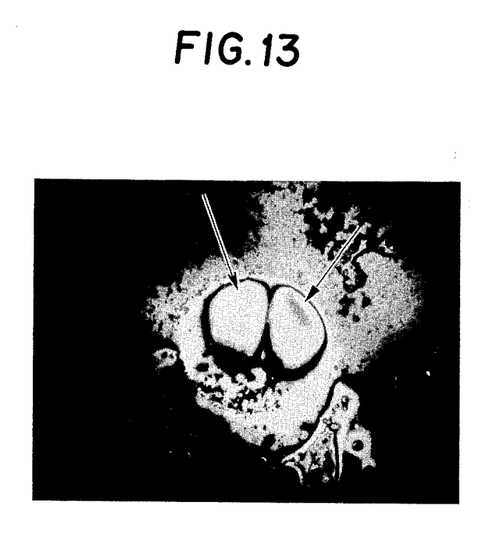
FIG. 13 is a photomicrograph showing a siloxane film formed on the friction surface of a silicon nitride ball.

FIG. 10 shows the coefficient of friction of silicon nitride as a function of load. FIG. 11 shows the coefficient of friction of silicon carbide as a function of load. FIG. 12 shows the coefficient of friction of alumina as a function of load. In each of these diagrams, the o and Δ symbols indicate the coefficient of friction at the start of wear, while the x and ∇ symbols indicate the coefficient of friction after 20 minutes have elapsed from the start of friction. In any case, the effect of the addition of silane coupling agent becomes marked with increasing loads. In particular, the coefficient of friction of silicon carbide under heavy loads becomes a value close to 0.1, demonstrating excellent boundary lubricity with low-viscosity water lubrication. Also, upon observation of the surface of the silicon nitride ball after friction under an optical microscope, as indicated by arrows in FIG. 13, a polymer film was verified to have formed on the surface. Thus, the strong siloxane film which has excellent lubricity formed by the reaction of the silane coupling agent with the friction material surface due to friction is thought to contribute to its wear resistance and low friction.

What is claimed is:

1. A method of improving the water lubricity of silicon nitride comprising the steps of:
   causing friction of said silicon nitride in the presence of water, thereby forming silanol groups on surfaces undergoing the friction;
   adding to said water a water-soluble silane coupling agent having alkoxyl groups to hydrolyze said alkoxyl groups into silanol groups; and
   reacting said silanol groups produced by the hydrolysis of said alkoxyl groups with said silanol groups formed on said surfaces, thereby forming a siloxane film having siloxane bonds on said surfaces.

2. The method according to claim 1, wherein said silane coupling agent is added to said water in a concentration in the range of 0.001M to 0.01M.

3. The method according to claim 1, wherein said silane coupling agent is one member selected from the group consisting of 3-(2-aminoethylaminopropyl)dimethoxymethylsilane, 3-(2-aminoethylaminopropyl)trimethoxysilane, 3-aminopropyltriethoxysilane, 3-aminopropyldimethylethoxysilane and 3-amino-propyldiethoxymethylsilane.

4. A method of improving the water lubricity of silicon nitride, comprising the steps of:
   causing friction of said silicon nitride within an aqueous solution of a water-soluble silane coupling agent having alkoxyl groups, thereby forming silanol groups on surfaces undergoing the friction and producing silanol groups through hydrolysis of said alkoxyl groups; and
   reacting said silanol groups produced by the hydrolysis of said alkoxyl groups with said silanol groups formed on said surfaces, thereby forming a siloxane film having siloxane bonds on said surfaces.

5. The method according to claim 4, wherein the concentration of said silane coupling agent is in the range of 0.001M to 0.1M.

6. The method according to claim 4, wherein said silane coupling agent is one member selected from the group consisting of 3-(2-aminoethylaminopropyl)dimethoxymethylsilane, 3-(2-aminoethylaminopropyl)trimethoxysilane, 3-aminopropyltriethoxysilane, 3-aminopropyldimethylethoxysilane and 3-aminopropyldiethoxymethylsilane.

* * * * *

UNITED STATES PATENT AND TRADEMARK OFFICE
CERTIFICATE OF CORRECTION

PATENT NO. :    4,956,205
DATED      :    SEPTEMBER 11, 1990
INVENTOR(S) :   YUJI ENOMOTO ET AL.

It is certified that error appears in the above-identified patent and that said Letters Patent is hereby corrected as shown below:

ON TITLE PAGE: Item [73]

In the Assignee, please delete "Ministry of International Trade; Ministry of International Trade & Industry, both of Tokyo, Japan" and insert --Ministry of International Trade & Industry, Tokyo, Japan--.

Signed and Sealed this

Twenty-eighth Day of April, 1992

Attest:

HARRY F. MANBECK, JR.

*Attesting Officer*          *Commissioner of Patents and Trademarks*